May 6, 1930.  G. F. WIKLE  1,757,105
TIRE BUILDING MACHINE
Filed Oct. 17, 1927  2 Sheets-Sheet 1
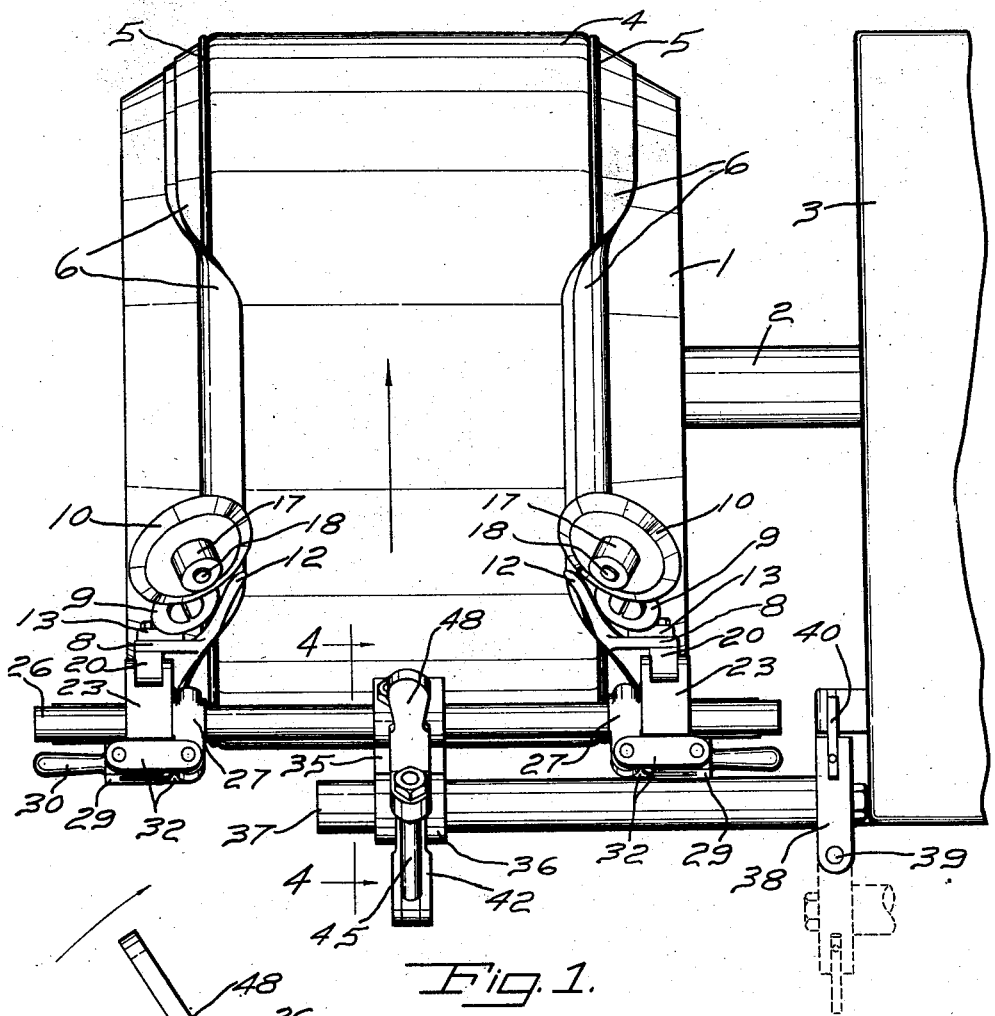
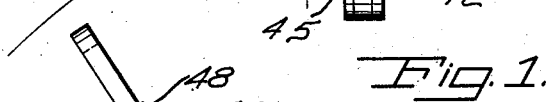
Fig. 1.
Fig. 4.
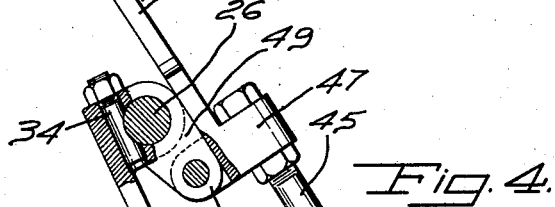
INVENTOR.
GEORGE F. WIKLE.
BY
ATTORNEY.

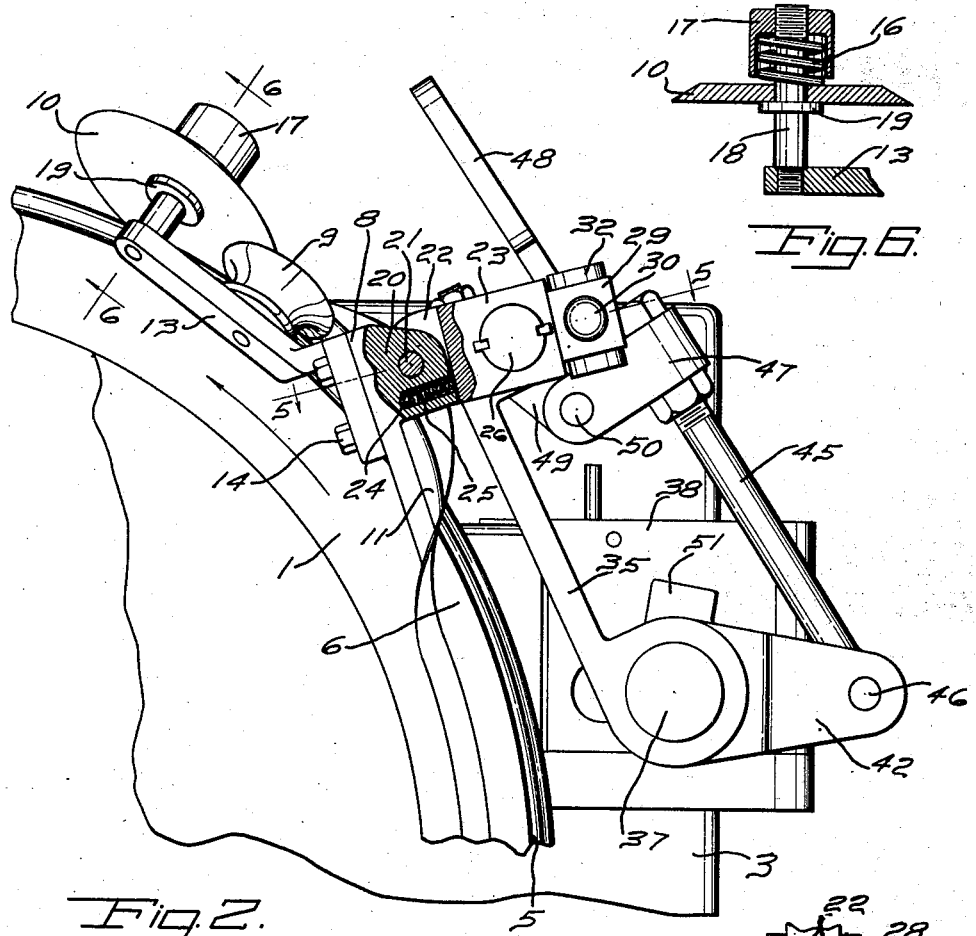
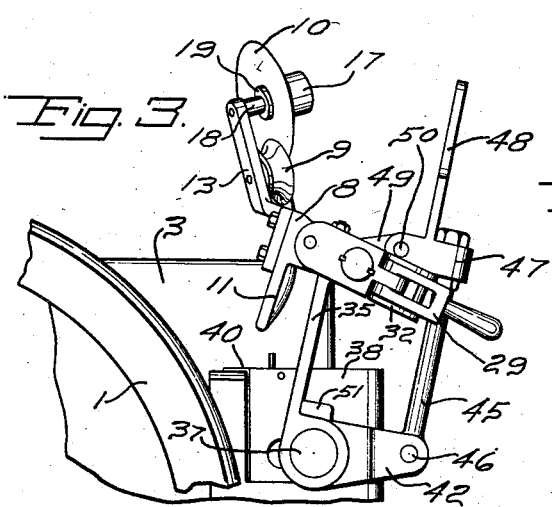
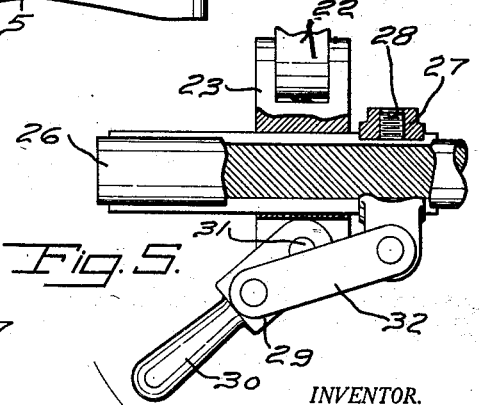

Patented May 6, 1930

1,757,105

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE-BUILDING MACHINE

Application filed October 17, 1927. Serial No. 226,534.

My invention relates to tire building machines of the type in which the tire carcass is built on a substantially flat drum. It has for an object the provision of means for automatically turning the edges of certain of the carcass plies, or other elements of the carcass, upwardly and backwardly around the bead cores. A further object is to provide means which will accomplish this operation in substantially one revolution of the building drum and operate simultaneously on both beads. Other and further objects will be apparent from the following specification and claims.

In the accompanying drawings which illustrate one embodiment of my invention,

Fig. 1 is a plan view showing the devices in operation;

Fig. 2 is a side elevation, on a larger scale, of the devices as shown in Fig. 1;

Fig. 3 is a view similar to Fig. 2, but on a reduced scale showing the parts in inoperative position;

Fig. 4 is a section substantially on line 4—4 of Fig. 1;

Fig. 5 is a section substantially on line 5—5 of Fig. 2, but with the toggle partly broken to indicate its operation; and Fig. 6 is a section on line 6—6 of Fig. 1.

Referring to the drawings, 1 designates the building drum which is secured to a shaft 2 driven from any suitable source of power, such as a motor, enclosed in housing 3. Carcass plies in position on the drum are indicated at 4 and the bead cores are shown at 5, the portions of the carcass plies which extend beyond the beads and which are to be turned back being designated by the numeral 6. The turn back devices, one for each edge of the carcass, are exactly similar except that they operate in opposite directions, and comprise turning plows 8, grooved bead engaging rolls 9, and stitchers 10. The plows are formed with a heel 11 adapted to be inserted beneath the edges of the carcass plies, and inwardly and upwardly extending turning fingers 12 which gradually turn the edges of the plies around the beads and onto the body of the carcass. The bead engaging rolls and the stitches are rotatably mounted on brackets 13 secured to the under side of plows 8 (as best shown in Figs. 2 and 3) by bolts 14. As will be clear from the drawings, rolls 9 and stitchers 10 are set at an angle so as to exert both a downward and inward pressure on the carcass. Rolls 9 are formed with an enlarged flange top which functions to form the carcass material tightly and completely around the bead while holding the bead against displacement. The stitcher 10 is spring-cushioned, as best shown in Fig. 6, by a coiled spring 16 positioned within a hollow cap 17 threaded on shaft 18, upon which the stitcher 10 is rotatably mounted, and engaging the surface of the stitcher, the downward movement of the latter being limited by a collar 19 secured to the shaft. The pressure exerted by spring 16 may be adjusted by turning cap 17 to raise or lower it on shaft 18.

Plows 8 are formed with upstanding lugs 20 pivoted at 21 in forked bearings 22 formed on blocks 23. As shown in Fig. 2 lugs 20 are recessed at 24 to receive springs 25 engaging blocks 23 and functioning to maintain the heels 11 in yielding contact with the drum 1 when the devices are in operative position. Blocks 23 are splined on a shaft 26 adjacent collars 27 which are secured in adjusted position on shaft 26 by set screws 28. Forks 29, provided with handles 30, are pivoted at 31 to the blocks 23 and are connected by links 32 to collars 27. The forks 29 and links 32 form toggles which, when the parts are in the position shown in Figs. 1 and 2, hold the plows 8 and their associated elements in operative position and function, when the handles 30 are swung in the direction of the arrow in Fig. 5, to move the plows, bead rolls, and stitchers transversely outwardly from the edges of the carcass.

Shaft 26 is adjustably secured by locking pin 34 to an arm 35 pivoted through a forked bearing 36 to a shaft 37 secured in a plate 38 pivoted at 39 to housing 3. The shaft 37 is releasably held in position adjacent the building drum by a latch 40 which may be released to permit plate 38, shaft 37, and the parts carried thereby to be swung into the position indicated in dotted lines in Fig. 1 to clear the drum for other building operations. An arm 42 is splined at 43 to shaft 37 between the forks of bearing 36, and its free end is connected to shaft 26 by a toggle in the form of a rod 45 pivoted at its lower end to the arm 42 at 46 and provided at its upper end with a head 47 formed with a handle 48, the head 47 being connected to shaft 26 by a link 49 pivoted at one end on the shaft and at the other end to the head at 50. With the parts as shown in Figs. 2 and 4, toggles 45—49 serve to releasably lock shaft 26 and the instrumentalities supported thereon in operative position adjacent the core since pivot 50 is on or just beyond the dead center between shaft 26 and pivot 46. The inward movement of pivot 50 is limited by the contact of handle 48 with arm 35. When arm 48 is swung in the direction of the arrow in Fig. 4 to raise pivot 50, arm 35 is free to pivot about shaft 37 and rod 45 is free to swing about pivot 46 permitting the parts to be moved to the position shown in Fig. 3, the rearward movement of arm 35 being limited by stop 51 formed on arm 42.

The operation is as follows. With blocks 23 at their extreme outward positions on shaft 26 and arm 35 in the position shown in Fig. 3, shaft 37 is swung from the dotted line position in Fig. 1 to the full line position shown in the latter figure. Handle 48 is then swung forward to lock shaft 26 in positon adjacent the building drum as shown in Fig. 2. Toggles 29—32 are then closed through handles 30 to bring plows 8 into operative relation with the carcass, the extending portions 6 of the plies having been preferably turned around the bead 5 by hand at the point of initial contact to assure that plows 8 will properly engage the carcass with heel 11 engaged beneath the extensions 6, turning fingers 12 overlying the inwardly turned portion of the extensions 6, rolls 9 snugly engaging the beads and stitchers 10 in position to stitch the turned portions down on the body of the carcass. The drum 1 is then rotated in the direction of the arrows in Figs. 1 and 2, plows 8 progressively turning the edges 6 upwardly and inwardly over the beads, rolls 9 forming the plies tightly about the beads, and angularly positioned stitchers 10 applying the turned back portions of the plies smoothly on the body of the carcass from the beads inwardly, as shown in Fig. 1. When the starting point is reached handles 30 are first swung, as indicated in Fig. 5, to move blocks 23 outwardly along shaft 26 and disengage plows 8, rolls 9, and stitchers 10 from the carcass. Handle 48 is then moved to the position shown in Fig. 3 and latch 40 disengaged to permit shaft 37 to be again swung to the dotted line position in Fig. 1 leaving the drum clear for further building operations.

Having described one embodiment of my invention, I claim:

1. A device of the character described comprising a plow mounted to be positioned in operative relation with a tire carcass supported on a rotatable drum, said plow being formed with an upwardly and inwardly extending finger adapted to engage an edge of the carcass plies and turn said edge around the bead core of the carcass, a contoured roll associated with the plow to engage the plies at the point where they are turned about the bead core, and a stitcher disc positioned to engage the turned edge of the plies inwardly of the bead.

2. A device of the character described comprising a plow mounted to be moved into operative relation with a tire carcass supported on a rotatable drum, said plow being formed with a heel engaging beneath a free edge of the carcass plies outside of the bead core, and an upwardly and inwardly extending finger adapted to turn said edge around the bead core, a grooved roll secured to the plow in position to engage the plies at the point where they are turned about the bead core and an angularly positioned stitcher disc secured to the plow and engaging the turned edge of the plies inwardly of the bead.

3. A device of the character described comprising a support adapted to be positioned adjacent the drum of a tire building machine, a plow pivoted to the support, a spring positioned to press the heel of the plow towards the surface of the building drum, a bracket secured to the plow and a bead engaging roll and a stitcher disc rotatably mounted on the bracket.

4. A device of the character described comprising a support adapted to be positioned adjacent the drum of a tire building machine, a plow pivoted to the support, a spring positioned to press the heel of the plow towards the surface of the building drum, and a flanged bead engaging roll and a spring-backed stitcher disc associated with the plow and movable therewith.

5. A device of the character described comprising a support adapted to be moved into a predetermined position adjacent a tire building drum, means to releasably lock the support in said position, a pair of members slidably mounted on the support, means to releasably lock said members in a predetermined spaced relation on said support and a fabric plow, a bead engaging roll, and a stitcher disc secured to each of said members.

GEORGE F. WIKLE.